(12) United States Patent
Chiaruzzi et al.

(10) Patent No.: US 6,788,348 B1
(45) Date of Patent: Sep. 7, 2004

(54) METHOD AND SYSTEM FOR PROCESSING DIGITAL IMAGES

(75) Inventors: Emmanuel Chiaruzzi, Grenoble (FR); Franck Seigneret, Tullins (FR)

(73) Assignee: ST Microelectronics SA, Montrouge (FR)

( * ) Notice: Subject to any disclaimer, the term of this patent is extended or adjusted under 35 U.S.C. 154(b) by 551 days.

(21) Appl. No.: 09/718,076

(22) Filed: Nov. 21, 2000

(30) Foreign Application Priority Data

Nov. 23, 1999 (FR) .............................................. 99 14757

(51) Int. Cl.[7] .............................. H04N 7/01; H04N 11/20
(52) U.S. Cl. ...................................... 348/453; 345/605
(58) Field of Search ................................. 348/453, 263, 348/237, 272, 708, 712, 713, 659, 660, 661, 630, 631, 447, 450, 441, 557; 345/600, 603, 604, 605; H04N 7/01, 11/02

(56) References Cited

U.S. PATENT DOCUMENTS 4,716,455 A * 12/1987 Ozawa et al. ............... 348/277
6,392,699 B1 * 5/2002 Acharya ...................... 348/273
6,570,616 B1 * 5/2003 Chen ........................... 348/272

FOREIGN PATENT DOCUMENTS

| EP | 0692915 | 1/1996 | ............ H04N/9/64 |
| EP | 0695095 | 1/1996 | ............ H04N/7/26 |
| WO | 97/24882 | 7/1997 | ............ H04N/9/64 |

* cited by examiner

*Primary Examiner*—Michael H. Lee
(74) *Attorney, Agent, or Firm*—Allen, Dyer, Doppelt, Milbrath & Gilchrist, P.A.; Lisa K. Jorgenson (57) ABSTRACT

Transforming digital images including luminance data relating to points with first coordinates and chrominance data relating to points with second coordinates is performed. More particularly, the transforming is performed where one of the luminance data and the chrominance data is more numerous than the other. This is done by processing the least numerous data by filtering to obtain least numerous data relating to points with identical coordinates to those of the most numerous data.

42 Claims, 4 Drawing Sheets

METHOD AND SYSTEM FOR PROCESSING DIGITAL IMAGES

FIELD OF THE INVENTION

The present invention relates to the field of digital image processing and, more particularly, to the processing of digital images which are displayed on a screen, in particular a computer or television screen.

BACKGROUND OF THE INVENTION

At present, the portable computer and television markets are beginning to overlap due to the development of the Internet and of interactive television. It is therefore important to be able to display graphical images (such as the web pages broadcast on the Internet) on a standard television screen in a visual format that is acceptable to a user.

Prior art systems used to suppress or limit a flicker effect caused by strong contrasts of the graphical images are often referred to as flicker filters. Since the flicker effect is due to the contrast between two consecutive lines (i.e., to high frequencies on a vertical column of the image), typical anti-flicker filter systems implement a low-pass vertical digital filtering. After the filtering, two consecutive lines are closer together in terms of color and the flicker effect is diminished.

Moreover, graphical objects are often displayed on the screen. These objects may take the form of windows or sub-windows whose height and/or width the user may wish to modify. The processing required by a change of dimensions of the graphical objects displayed involves storing pixels from one or more lines in fast memories, resulting in high costs.

Various image formats may be used. In the YCbCr 420 format, which is known in the art, luminance data and chrominance data may be stored separately. The chrominance data are four times less numerous than the luminance data, twice in the horizontal direction and twice in the vertical direction. A particular chrominance data item relates to a point situated at the center of four neighboring points for which luminance data are available, and the various points are coplanar. The YCbCr 420 format is economical in terms of memory space used on account of the small number of chrominance data, but is not suitable for processing graphical objects.

The YCbCr 444 format is also known in the art. In this format, the luminance data and chrominance data are equal in number and relate to points with the same coordinates. It is a known practice to prepare an image for display in the YCbCr 444 format by concatenating the luminance and chrominance data one after another for each point of the image.

It is possible to carry out an image format transformation to go from the YCbCr 420 format to the YCbCr 444 format in real time in a display facility immediately before a display. Even so, this technique is not suitable for processing graphical objects.

SUMMARY OF THE INVENTION

An object of the present invention is to display graphical images (such as web pages broadcast on the Internet) on a standard television screen in a visual format that is acceptable to a user.

Another object of the invention is to provide a method of economical graphical transformation which does not require an excessive amount of memory and may be used for images of high quality regardless of the size of the graphical object processed.

Yet another object of the present invention is to provide a method of graphical transformation capable of performing changes of format of an image to render the image suitable for digital graphical processing and to do so relatively simply.

According to the invention, a transformation method for digital images including luminance data relating to points with first coordinates and chrominance data relating to points with second coordinates where one of the luminance data and the chrominance data is more numerous than the other includes processing the least numerous data by filtering to obtain least numerous data relating to points with identical coordinates to those of the most numerous data. Moreover, a vertical filtering and a horizontal filtering may be performed, and an initial phase shift filtering may also be performed.

Furthermore, the number of the least numerous data may be increased in the horizontal direction or in the vertical direction. The luminance data may be the most numerous and the chrominance data may be the least numerous, for example. Specifically, the luminance data may be four times more numerous than the chrominance data. The luminance and chrominance data may also be stored in a memory and processed to change dimensions of the image. Additionally, the change of dimensions may be performed by hardware used for the transformation.

A graphical processing system according to the present invention capable of implementing the above method as well as other graphical processing operations is also provided. Such other graphical processing operations may include, for example, changing dimensions of a graphical object to obtain an enlargement or a reduction of a window displayed on a television or computer screen. The system may include a first memory and a second memory for storing pixels awaiting processing, a graphical processing system for changing the dimensions of the images arranged downstream from the second memory, and an arithmetic logic unit arranged downstream from the first memory and from the graphical processing system for arranging data received therefrom in the order desired for subsequent display. The graphical processing system may be used to process the least numerous data to obtain least numerous data relating to points with identical coordinates to those of the most numerous data.

The system may be used for graphics subsystems including a two-dimensional accelerator which acts as an operator on rectangular graphical objects, such as windows. This accelerator or module for transferring bit blocks, referred to as a "blitter," is used for updating zones of the image, and it may also advantageously be used in format transformation and in other graphical processing operations.

The invention therefore allows a change of image format carried out time relative to the display, i.e., from memory to memory. It is possible to accept a relatively slow speed of execution of the change of format relative to the speed which would be demanded in real time. Hence, it is possible to have quality processing implementing one or more filters with a considerable number of intervals (e.g., five).

The passband requirements of the display remain unchanged. Thus, since the processing is from memory to memory, the entire device for generating digital images is not forced to follow the standard order of refreshing of the display screen. The amount of memory required for the line buffer memories can therefore be reduced significantly. The filter need not be duplicated in the case of a global system linked to several graphical displays.

YCbCr 420 or 444 does not specify that the luminance and the chrominance must be stored in separate memories. Yet, the present invention is applicable when one seeks to access YCbCr 420-coded pixels stored in two separate memories.

BRIEF DESCRIPTION OF THE DRAWINGS

The present invention will be better understood by studying the detailed description of one embodiment of the invention provided by way of non-limitative example and illustrated by the appended drawings, in which.

DETAILED DESCRIPTION OF THE PREFERRED EMBODIMENTS

Figure 1:
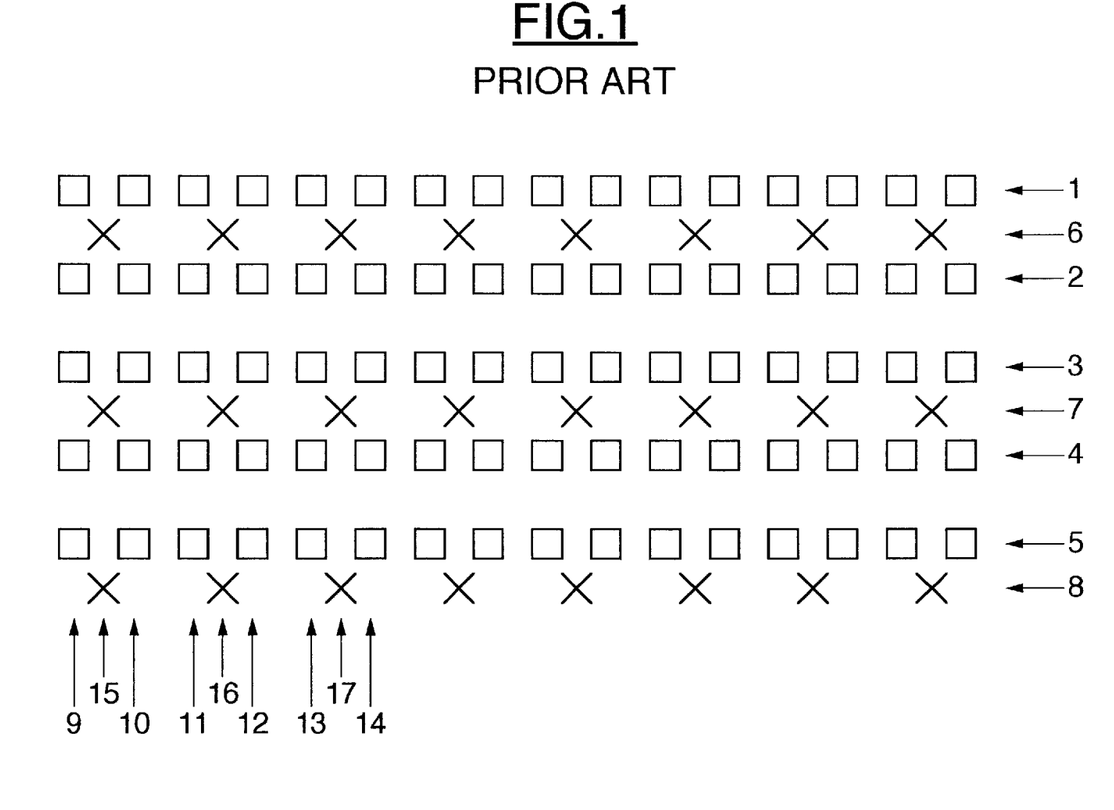
FIG. 1 is a schematic diagram of the arrangement of data in the YCbCr 420 format according to the prior art.

Turning now to the schematic diagram of FIG. 1 showing the arrangement of data in the YCbCr 420 format, the squares represent luminance data and the crosses represent chrominance data. The luminance data are arranged in regularly spaced rows 1, 2, 3, 4 and 5. The chrominance data are arranged in rows 6, 7 and 8, also regularly spaced. Row 6 is arranged equidistant between rows 1 and 2. Row 7 is arranged equidistant between rows 3 and 4. Row 8 is arranged equidistant between row 5 and a row (not shown) arranged underneath. No chrominance data rows are between the luminance data rows 2 and 3 and 4 and 5. Thus, the so-called YCbCr 420 format includes twice as many luminance data rows as chrominance data rows.

The luminance data are arranged in columns, the first few of which have been labeled from 9 to 14. These columns 9–14 are regularly spaced. The chrominance data are also arranged in regularly spaced columns. Column 15 is arranged equidistant between columns 9 and 10. Column 16 is arranged equidistant between columns 11 and 12. Column 17 is arranged equidistant between columns 13 and 14, and so on.

The YCbCr 420 format therefore includes twice as many luminance data columns as chrominance data columns. In total, an image presented in the YCbCr 420 format comprises four times as many luminance data as chrominance data. Stated otherwise, a chrominance data item has as immediate neighbor four luminance data items arranged equidistantly, where each of the four luminance data items has only luminance data as immediate neighbors except for the chrominance data item.

Thus, the chrominance data item positioned in row 7 and column 16 neighbors the luminance data positioned in row 3 and columns 11 and 12 and in row 4 and columns 11 and 12. The luminance data item positioned in row 3 and column 11 neighbors the luminance data of row 3 and of columns 10 and 12, of row 2 and of columns 10, 11 and 12, of row 4 and of columns 10, 11 and 12, and of the chrominance data item of row 7 and column 16.

Figure 2:
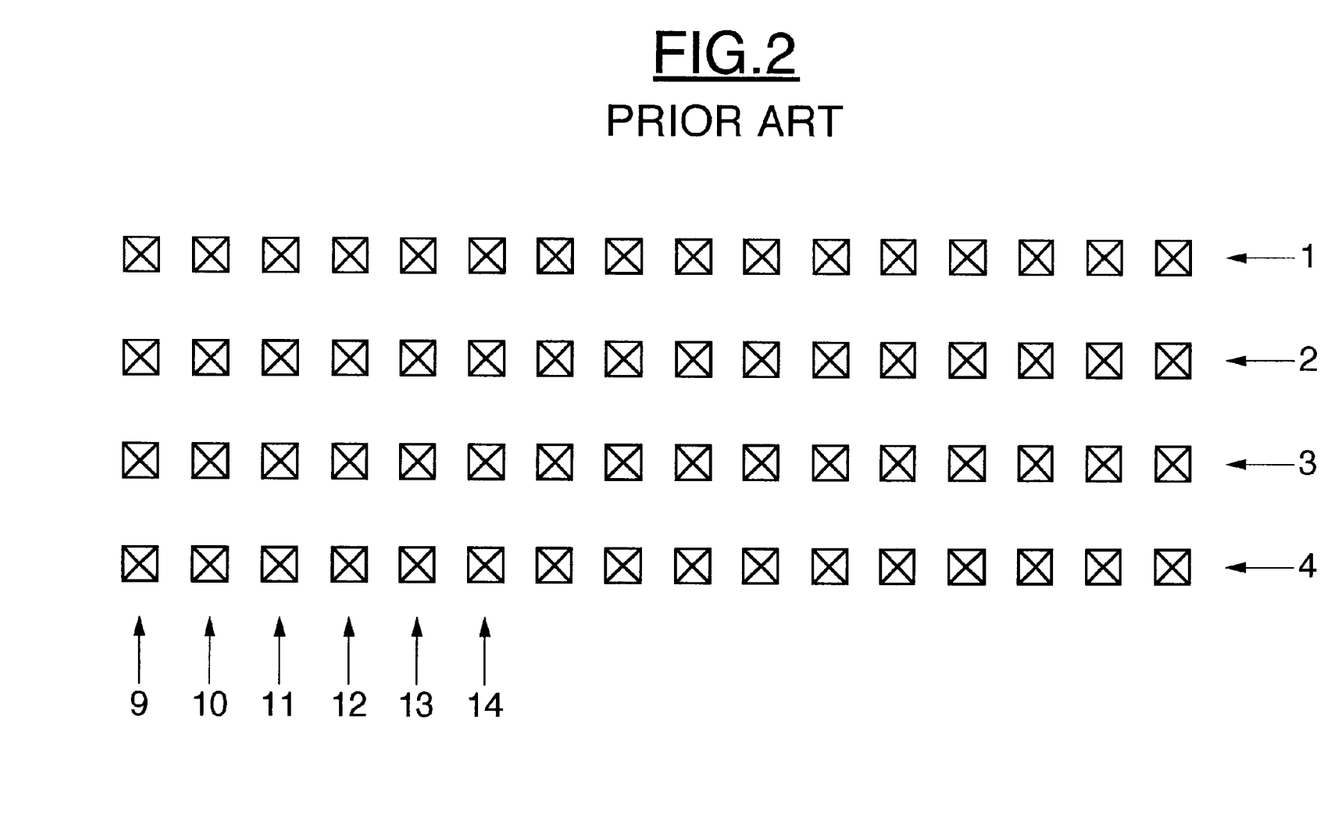
FIG. 2 is a schematic diagram of the arrangement of data in the YCbCr 444 format according to the prior art.

According to the YCbCr 444 format, illustrated in FIG. 2, the same number of chrominance data and luminance data are provided. The spatial positions of the luminance and chrominance data coincide. Thus, for the position defined by the intersection of row 3 and column 11, one has a luminance data item and a chrominance data item.

One could conceive of simply duplicating a chrominance data item horizontally and vertically and assigning the duplicate chrominance data to the four closest spatial positions for which one possesses luminance data. However, a poor quality image would result that would not be satisfactory.

Since the chrominance samples are by a factor of 2 horizontally and vertically in the YCbCr 420 format, the transformation of an image into the YCbCr 444 format requires the quadrupling of the amount of information relating to chrominance. The quality of the image obtained at the output depends mainly on the manner in which the missing samples are generated. According to the invention, a digital filter is used for the generation of the missing samples. The higher the number of intervals of the filter, the better the quality of the image at the output. When a filter having N intervals is used for the generation of the missing samples, N samples are input into the filter to calculate a chrominance data item at the output.

Figure 3:
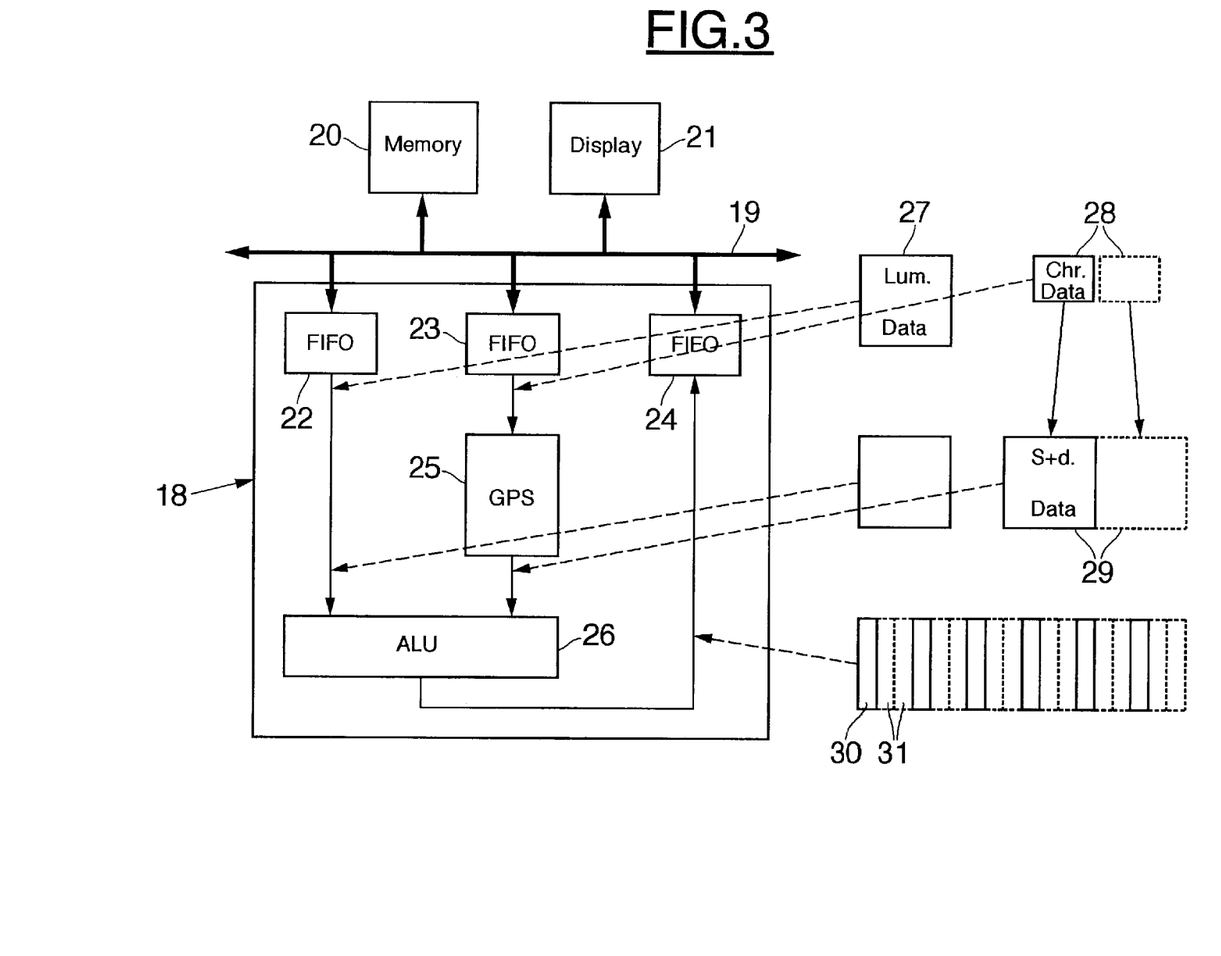
FIG. 3 is a schematic diagram of a system for implementing a method according to one embodiment of the present invention.

A graphical system according to the invention is illustrated in FIG. 3. The system includes a bit block transfer module 18, also referred to as a "blitter," linked to a communication bus 19. Data may be transferred over the bus 19 between the module 18 and other elements such as a memory 20, a display 21 equipped for example with a screen, etc. The module 18 receives digital data stored in the memory 20 via the bus 19.

The module 18 may include a first memory 22 of a first-in first-out (FIFO) type linked to the bus 19 and a second memory 23 of the same type as the memory 22 and also linked to the bus 19. The two memories 22 and 23 receive data by way of the bus 19. The module 18 also includes a third memory 24 of the first-in first-out type linked to the bus 19 and able to send data over the bus 19. The memories 22–24 have a buffer role and store the pixels awaiting processing.

An output of the second memory 23 is linked to a graphical processing system (GPS) 25 having an output linked to an arithmetic logic unit (ALU) 26. The output of the first memory 22 is also linked to the arithmetic logic unit 26. An output of the arithmetic logic unit 26 is linked to the third memory 24.

The module 18 operates in the following manner. The luminance data 27 emanating from a first area of the memory 20 are transmitted via the bus 19 and are stored in the first memory 22 before being supplied to the arithmetic logic unit 26. The chrominance data in reduced format 28, for example in YCbCr 420 format, stored in a second area of the memory 20 are transmitted via the bus 19 and are stored by the second memory 23. The chrominance data 28 are then sent to the graphical processing system 25 which transforms them by increasing the number of the data and outputs to the arithmetic logic unit 26 chrominance data in standard format 29, for example in YCbCr 444 format.

The arithmetic logic unit 26 receiving the luminance data 27 and the chrominance data in normal format 29 performs a concatenation of the data. This is done to reconstitute a data string in which the luminance data 30 relating to a particular pixel are adjacent to the chrominance data 31 relating to the same pixel. The concatenated luminance and chrominance data are output to the third memory 24 and are then transmitted via the bus 19 to a memory, such as the memory 20 or another memory (not shown).

Figure 4:
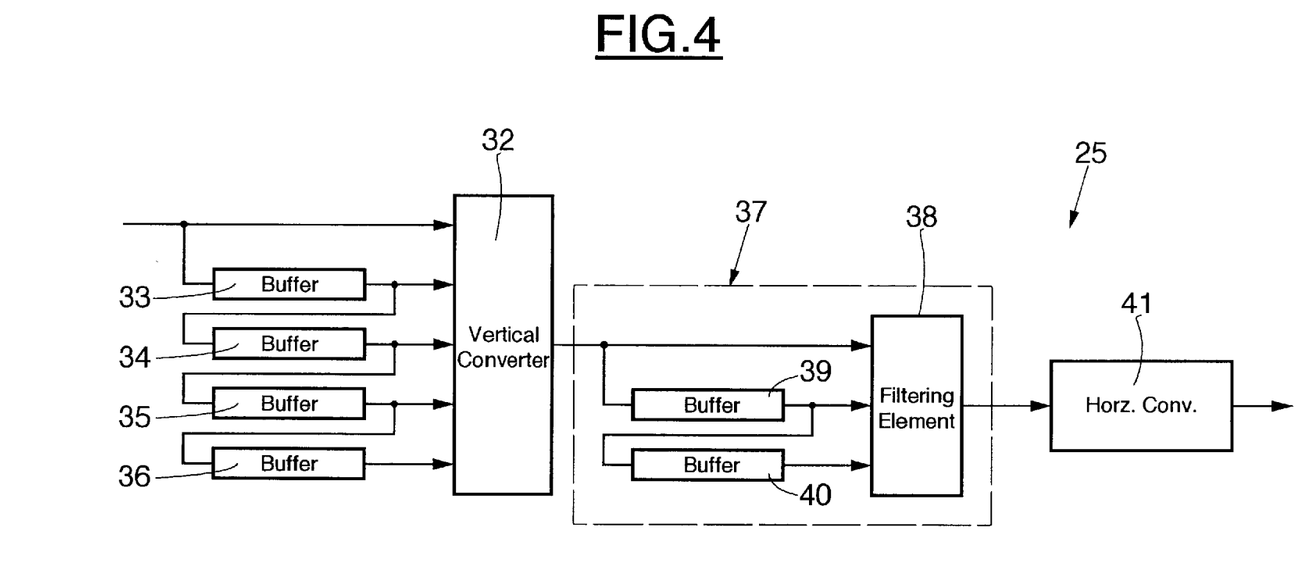
FIG. 4 is a detailed schematic diagram of the system of FIG. 3.

A graphical processing system 25 for horizontally and vertically modifying the dimensions of a graphical object and/or for transforming the format of a graphical object is shown in FIG. 4. The graphical processing system 25 includes a five-interval vertical converter 32 which receives on its five inputs the data relating to the pixels of the current row and those relating to the pixels of the four previous rows from four buffer memories 33, 34, 35 and 36. The buffers 33–36 are arranged to allow a converter 32 to perform the interpolation of the five bits received at the same time. The buffer memories 33, 34, 35 and 36 operate according to a first-in first-out mode.

The graphical processing system 25 also includes a flicker filter 37 including with a three-interval filtering element 38 and with two buffer memories 39 and 40. The graphical processing system 25 also includes a five-interval horizontal converter 41 at the output of the filtering system 37 for modifying the size of the graphical object in the horizontal direction.

The conversion, both vertical and horizontal, is performed on a specified number of bits (e.g., three bits). It is therefore possible to magnify the graphical object up to eight times in each dimension. It is also possible to generate seven pixels with intermediate coordinates between two original pixels. Thus, the chrominance data at the input will have coordinates 0.5, 2.5, 4.5, etc., while the luminance data stored in the memory 22 will have coordinates 1, 2, 3, 4, 5, etc.

In each column of chrominance data, the vertical converter 32 generates new chrominance data in the rows corresponding to the luminance data by interpolation of five pixels to generate one. By way of example, the output pixel from any column and from row 5 may be generated by weighting the pixels of rows 0.5, 2.5, 4.5, 6.5, and 8.5. The weighting will take into account the position of the output pixel with respect to the five pixels used to generate it. Thus, an output pixel of the same column and of row 4 can be generated by a different weighting of the same pixels of rows 0.5, 2.5, 4.5, 6.5 and 8.5.

In each row with coordinates identical to the luminance coordinates, the horizontal converter 41 generates new chrominance data in the columns corresponding to the luminance data by the interpolation of five pixels to generate one. The weighting may be of the same type as that described above.

In the case of magnification/reduction, the horizontal converter 41 needs five input pixels to generate one output pixel with a suitable weighting of the five input pixels according to the chosen degree of magnification/reduction and the position of the output pixel with respect to the input pixels. By way of example, if one chooses to magnify a graphical image horizontally by a factor of 2, the system will generate pixels for abscissae 1, 1.5, 2, 2.5 etc. If one chooses a factor of 1.25, the system will generate pixels for the abscissae 1, 1.75, 2.5, 3.25, 4 etc. These pixels will thereafter be placed linearly in the memory 20 or in another memory. The factor 1.25 is meaningful in the case of magnification, but for the YCbCr 420→YCbCr 444 conversion, only the factor 2 is used. To change the dimensions of a rectangular graphical object, a polyphase digital filter may be used with N intervals and $2^P$ sub-positions.

An increment value is coded with an integer part and a decimal part. This increment represents the distance separating two pixels at the output of the filter. If this increment is greater than 1, a reduction in the dimension is performed. In the contrary case, the object is magnified. If the increment is equal to 1.25, the number of pixels generated is less than the number of pixels received at the input of the filter. If the increment is less than 1, the number of pixels generated is greater than the number of pixels received. The graphical object is magnified.

These pixels are generated as follows. The increment INC is split up into integer and decimal parts. Each time a pixel is generated, this increment is added to the remainder of the accumulated decimal part, where:

COUNT=decimal part [COUNT]+INC

This variable COUNT therefore includes an integer and a decimal part. The integer part represents the number of pixels to be taken into account before generating the next pixel. The decimal part represents the intermediate position of the pixel to be generated with respect to the last pixel to be taken into account.

Once implemented, to define the sub-positions only the first p bits of the decimal part are kept to produce the $2^P$ sub-positions. A filter with N intervals corresponds to each sub-position and performs a weighted average dependent on the sub-position over the N samples present in the filter. Each time a pixel is generated, the algorithm of the filter gives the sub-position of the next pixel to be generated, and hence the number of the filter to be applied (this is the decimal part of COUNT) as well as the number of pixels to be taken into account (this is the integer part of COUNT).

The filter is positioned in the following way to generate the pixels. Initially, the pixel 0 is duplicated (N–1)/2 times (where N is odd) in such a way that this filter is centered on the pixel 0. Within the framework of the vertical filter, the value of COUNT is updated at the end of each line. The algorithm then indicates how many lines have to be accessed as well as the sub-position of the next line to be generated. Within the framework of the horizontal filter, the value of COUNT is updated each time a pixel is generated.

The graphical processing system 25 (or bit block transfer module) allows, in a graphical circuit, accelerated operation by the transferring of graphical blocks such as a window in a Windows® environment. In other embodiments, the filtering system 37 may be arranged downstream from the bit block transfer module, or it may be eliminated if the images to be processed exhibit a small risk of flicker.

The length of the line memory is, preferably, limited to 128 and thus benefits from a two-dimensional re-sampling system based on the columns. Stated otherwise, the image is sliced into zones whose lines amount to 128 bits to use less memory during filtering. The vertical converter is arranged upstream of the flicker filter. This is because a five-interval vertical converter runs the risk of reintroducing flicker. It is therefore advantageous to perform the filtering after the vertical conversion. On the other hand, the horizontal converter is downstream from the flicker filter so that the size of the line memories is not affected by the change of horizontal scale. This is possible since the horizontal conversion is a linear operation which produces no additional flicker.

Of course, the system described above for two-dimensional images is applicable to three-dimensional images based on a matrix of voxels. By virtue of the invention, one profits from the characteristics of graphical images which are in general relatively stable in that the user uses them for a duration which may last as long as several minutes or several tens of minutes. It is therefore particularly advantageous to deal with the format phenomenon as soon as the image is created. One therefore substantially circumvents real-time constraints, speed constraints, resolution of the screen, and passband constraints. Images whose original format prohibited high-quality graphical processing can thus be processed. It is therefore possible to undertake high-quality digital graphical processing on images arising from an MPEG type decoder in a reduced format, for example of the YCbCr 420 kind.

What is claimed is:

1. A method of transforming a digital image comprising luminance data relating to points with first coordinates and chrominance data relating to points with second coordinates where the luminance data and the chrominance data are different in number so that ore of the luminance and chrominance data comprises most numerous data and the other comprises least numerous data, the method comprising:

filtering the least numerous data to obtain least numerous data relating to points with identical coordinates to those of the most numerous data.

2. The method according to claim 1 wherein filtering comprises vertical filtering and horizontal filtering.

3. The method according to claim 1 wherein filtering comprises an initial phase shift filtering.

4. The method according to claim 1 further comprising increasing the number of least numerous data in a horizontal direction.

5. The method according to claim 1 further comprising increasing the number of least numerous data in a vertical direction.

6. The method according to claim 1 wherein the luminance data are the most numerous data and the chrominance data are the least numerous data.

7. The method according to claim 6 wherein the luminance data are four times more numerous than the chrominance data.

8. The method according to claim 1 further comprising storing the luminance and chrominance data in a memory after filtering.

9. The method according to claim 8 further comprising processing the luminance and chrominance data after storing to change dimensions of the image.

10. The method according to claim 9 wherein processing is performed using a graphical processing system also used for filtering.

11. The method according to claim 9 further comprising buffering pixels of the digital image comprising the least numerous data and the most numerous data; and wherein filtering comprises filtering the least numerous data from the pixels.

12. The method according to claim 11 further comprising arranging pixels modified by filtering in a desired display order.

13. A method for transforming a digital image comprising luminance data relating to points with first coordinates and chrominance data relating to points with second coordinates where the luminance data and the chrominance data are different in number so that one of the luminance and chrominance data comprises most numerous data and the other comprises least numerous data, the method comprising:

buffering pixels of the digital image comprising the least numerous and most numerous data;

filtering the least numerous data from the pixels to obtain least numerous data relating to points with identical coordinates to those of the most numerous data to modify the pixels and change dimensions of the digital image; and arranging the modified pixels in a desired display order.

14. The method according to claim 13 wherein filtering comprises vertical filtering and horizontal filtering.

15. The method according to claim 13 wherein filtering comprises an initial phase shift filtering.

16. The method according to claim 13 further comprising increasing the number of least numerous data in a horizontal direction.

17. The method according to claim 13 further comprising increasing the number of least numerous data in a vertical direction.

18. The method according to claim 13 wherein the luminance data are the most numerous data and the chrominance data are the least numerous data.

19. The method according to claim 18 wherein the luminance data are four times more numerous than the chrominance data.

20. The method according to claim 13 further comprising storing the luminance and chrominance data in a memory after arranging.

21. The method according to claim 13 wherein filtering and processing are performed using a graphical processing system.

22. A system for transforming a digital image comprising luminance data relating to points with first coordinates,and chrominance data relating to points with second coordinates where the luminance data and the chrominance data are different in number so that one of the luminance and chrominance data comprises most numerous data and the other comprises least numerous data, the system comprising:

a graphical processing system for changing dimensions of the digital image;

said graphical processing system filtering the least numerous data to obtain least numerous data relating to points with identical coordinates to those of the most numerous data.

23. The system according to claim 22 further comprising first and second memories providing a buffer for pixels of the digital image awaiting processing; and wherein said graphical processing system is downstream from said first memory.

24. The system according to claim 23 further comprising an arithmetic logic unit downstream from said first and second memories and said graphical processing system for arranging data received therefrom in a desired display order.

25. The system according to claim 24 farther comprising a third memory for storing the luminance and chrominance data output by said arithmetic logic unit.

26. The system according to claim 25 wherein each of said first, second and third memories comprises a first-in first-out memory.

27. The system according to claim 22 wherein said graphical processing system performs vertical filtering and horizontal filtering.

28. The system according to claim 22 wherein said graphical processing system performs an initial phase shift filtering.

29. The system according to claim 22 wherein said graphical processing system increases the number of least numerous data in a horizontal direction.

30. The system according to claim 22 wherein said graphical processing system increases the number of least numerous data in a vertical direction.

31. The system according to claim 22 wherein the luminance data are the most numerous data and the chrominance data are the least numerous data.

32. The system according to claim 31 wherein the luminance data are four times more numerous than the chrominance data.

33. A system for transforming a digital image comprising luminance data relating to points with first coordinates and chrominance data relating to points the second coordinates where the luminance data and the chrominance data are different in number so that one of the luminance and chrominance data comprises most numerous data and the other comprises least numerous data, the system comprising:

- at least one memory providing a buffer for pixels of the digital image awaiting processing;
- a graphical processing system downstream from said at least one memory for changing dimensions of the digital image, the graphical processing system filtering the least numerous data to obtain least numerous data elating to points with identical coordinates to those of the most numerous data; and
- an arithmetic logic unit downstream from said at least one memory and said graphical processing system for arranging data received therefrom in a desired display order.

34. The system according to claim 33 wherein said at least one memory comprises first and second memories; and wherein said graphical processing system is downstream from said first memory and said arithmetic logic unit is downstreamn from said second memory.

35. The system according to claim 33 wherein said at least one memory comprises a first-in first-out memory.

36. The system according to claim 33 wherein said graphical processing system performs vertical filtering and horizontal filtering.

37. The system according to claim 33 wherein said graphical processing system performs an initial phase shift filtering.

38. The system according to claim 33 wherein said graphical processing system increases the number of least numerous data in a horizontal direction.

39. The system according to claim 33 wherein said graphical processing system increases the number of least numerous data in a vertical direction.

40. The system according to claim 33 wherein the luminance data are the most numerous data and the chrominance data are the least numerous data.

41. The system according to claim 40 wherein the luminance data are four times more numerous than the chrominance data.

42. The system according to claim 33 further comprising a memory for storing the luminance and chrominance data output by said arithmetic logic unit.

* * * * *

UNITED STATES PATENT AND TRADEMARK OFFICE
CERTIFICATE OF CORRECTION

PATENT NO. : 6,788,348 B1
DATED : September 7, 2004
INVENTOR(S) : Emmanuel Chiaruzzi and Franck Seigneret It is certified that error appears in the above-identified patent and that said Letters Patent is hereby corrected as shown below:

Column 7,
Line 10, delete "ore" insert -- one --

Column 8,
Line 20, delete "coordinates,and" insert -- coordinates, and --

Column 9,
Line 11, delete "elating" insert -- relating --
Line 21, delete "downstreamn" insert -- downstream --

Signed and Sealed this

First Day of February, 2005

JON W. DUDAS
*Director of the United States Patent and Trademark Office*